(12) United States Patent
Porter et al.

(10) Patent No.: US 6,282,893 B1
(45) Date of Patent: Sep. 4, 2001

(54) SELF-CONTAINED ACTUATOR

(75) Inventors: Don B. Porter, Avra Valley; Wayne D. Shapiro, Chandler, both of AZ (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/430,955

(22) Filed: Nov. 1, 1999

Related U.S. Application Data

(63) Continuation-in-part of application No. 09/378,207, filed on Aug. 19, 1999.

(51) Int. Cl.⁷ .................................................. F16D 31/02
(52) U.S. Cl. ........................................ 60/477; 92/110
(58) Field of Search ............................. 60/477, 478, 481, 60/473, 476; 92/110; 91/461

(56) References Cited

U.S. PATENT DOCUMENTS

| | | |
|---|---|---|
| 1,088,002 | 2/1914 | White et al. . |
| 2,455,948 | 12/1948 | Ray . |
| 2,457,467 | 12/1948 | Hartman . |
| 2,570,383 | 10/1951 | Russell . |
| 2,631,431 | 3/1953 | Grebe . |
| 2,672,731 | 3/1954 | Ashton . |
| 2,751,753 | 6/1956 | Ray . |
| 2,841,960 | 7/1958 | Holan et al. . |
| 2,885,860 | 5/1959 | Ray . |
| 2,939,283 | 6/1960 | Ashton . |
| 2,944,400 | 7/1960 | Ashton . |
| 2,976,845 | 3/1961 | Goldring . |
| 2,978,283 | 4/1961 | Rosen . |
| 3,029,904 | 4/1962 | Goldring . |
| 3,202,062 | 8/1965 | Burden . |
| 3,331,289 | 7/1967 | Horst . |
| 3,338,136 | 8/1967 | Jerome et al. . |
| 3,394,544 | 7/1968 | Jackoboice . |
| 3,555,966 | 1/1971 | Coniglio . |
| 3,635,242 | 1/1972 | Coutenay et al. . |
| 3,698,187 | 10/1972 | Logan . |
| 3,828,556 | 8/1974 | Nolden . |
| 3,902,318 | 9/1975 | Becker et al. . |
| 3,905,279 | 9/1975 | Yadon . |
| 3,928,968 | 12/1975 | Becker et al. . |
| 4,165,675 | 8/1979 | Cryder et al. . |
| 4,280,396 | 7/1981 | Zeuner et al. . |
| 4,355,565 | 10/1982 | Bianchetta . |
| 4,418,612 | 12/1983 | Nanda . |
| 4,551,973 | * 11/1985 | Broadhead ............................ 60/477 |
| 4,590,764 | 5/1986 | Escobosa . |
| 4,630,441 | 12/1986 | Chamberlain . |
| 4,665,699 | 5/1987 | Krusche . |
| 4,667,472 | 5/1987 | Clay et al. . |
| 4,716,729 | * 1/1988 | Kakeya ............................. 60/476 X |
| 4,718,329 | 1/1988 | Nakajima et al. . |
| 5,044,445 | 9/1991 | Kayahara . |
| 5,186,095 | * 2/1993 | Todd ................................ 92/108 X |
| 5,331,882 | 7/1994 | Miller . |
| 5,351,599 | 10/1994 | Stoll . |
| 5,454,291 | 10/1995 | Ulm et al. . |
| 5,568,759 | * 10/1996 | Aardema ............................ 91/461 |
| 5,758,862 | * 6/1998 | Sturman ........................... 60/477 X |
| 5,823,088 | 10/1998 | Frisch . |

\* cited by examiner

*Primary Examiner*—John E. Ryznic
(74) *Attorney, Agent, or Firm*—Frankiln Gubernick

(57) ABSTRACT

A hydraulic cylinder in which the cylinder head contains a motor-driven fluid pump, fluid reservoir, and a main control valve for the cylinder. The cylinder includes a transfer tube that extends through the center of the cylinder's piston and terminates within a hollow ported section of a piston rod. The cylinder head can additionally include two electrically-actuated pilot valves and two pilot-operated check valves. The pilot-operated check valves include structure that, in combination with passages in the cylinder head, cause both pilot-operated check valves to open when pressurized fluid is being directed to one of the pilot-operated check valves by the main control valve.

28 Claims, 10 Drawing Sheets

SELF-CONTAINED ACTUATOR

This application is a Continuation-In-Part of currently pending application Ser. No. 09/378,207, filed Aug. 19, 1999.

FIELD OF THE INVENTION

The invention is in the field of hydraulic equipment. More particularly, the invention is a hydraulic cylinder designed to inwardly contain major portions of its control system. The cylinder furthermore includes a unique internal structure that optimizes the functionality of the unit. In a second embodiment of the invention, the cylinder is substantially self-contained and includes all of the components of the first embodiment, plus a fluid reservoir, a pump to pressurize the fluid, and a motor that drives the pump.

BACKGROUND OF THE INVENTION

Complex hydraulic systems are often used in machines that must apply a large force to a load. Examples of machines of this type are earthmovers, such as front-end loaders and backhoes, and cranes. The hydraulic system functions to transfer power to various portions of the machine. Since these machines are typically used in harsh and/or remote locations, the machines must be reliable and easy to maintain.

A hydraulic system for a heavy-duty machine will usually include one or more linear actuators/hydraulic cylinders, a reservoir, and a high-capacity hydraulic pump that is driven by a powerful motor. The motor may also function to propel the machine. The operator of the machine controls the operation of the machine's hydraulic components through the use of valves that affect the flow of hydraulic fluid to and from said components. The application of pressurized fluid to a hydraulic cylinder in a predetermined manner will cause the cylinder's inwardly-contained piston to move within the body of the cylinder. As a result, the piston rod attached to the piston will be either extended from, or retracted into, the cylinder to cause the desired movement of the machine's member(s) attached to the cylinder.

In a typical hydraulic system, the control valve that is responsible for the operation of any particular hydraulic cylinder is located at a distance from the cylinder. Long flexible hoses and/or pipes are used to connect together the control valve, the cylinder, the pump and the reservoir. Depending on the complexity of the system, additional hoses may be employed between main and pilot valves, and between system check valves and the control and/or pilot valve(s).

One problem with prior art hydraulic systems is that while most of a hydraulic system's components are very durable, they are still susceptible to damage. By the time the pump, reservoir, valves and hydraulic cylinders are connected together, the end result is a large number of hoses, fittings, pipes and valves located in damage-prone areas. Many of these components are difficult and/or expensive to replace. One should also note that not only are the hoses susceptible to being punctured, they can also be damaged through environmental degradation.

Another problem with prior art hydraulic systems is leakage. Not only can each component of a hydraulic system leak, but the fittings that are used to connect together the different components can also leak. At the very least, leakage of hydraulic fluid can pose both safety and maintenance problems. If the machine is used in an environmentally-sensitive location, leakage problems are exacerbated since any leaked hydraulic fluid must be recovered, along with any contaminated soil.

In some hydraulic systems, the use of connecting hoses is minimized by mounting the hydraulic cylinder's control valve, and in some cases, a pump and reservoir, directly onto the side of the hydraulic cylinder. However, this does not substantially avoid having hydraulic components located in an exposed condition where they can be damaged by falling debris or by accidental contact with external structure or formations. This also creates a bulbous, awkwardly-sized unit that cannot be fitted within the closely-packed confines found in many machines.

SUMMARY OF THE INVENTION

The invention is a hydraulic cylinder having a design optimized for durability, convenience and overall low cost. The cylinder may be employed in almost any machine in which a hydraulic cylinder is required. The invention is especially useful for employment in machines subject to hard usage and harsh environmental conditions, such as, but not limited to, earth-working machinery and cranes.

A hydraulic cylinder in accordance with the invention is similar in outward appearance to most standard hydraulic cylinders. However, the head portion of the cylinder, also known as a cylinder head, includes the cylinder's main control valve. The cylinder head preferably further includes one or more electrically-actuated pilot valves and may include other ancillary components required to control fluid flow to internal areas of the cylinder, such as one or more pilot-operated check valves. In a second embodiment of the invention, the cylinder head also contains a fluid reservoir, pump and motor.

Like prior art hydraulic cylinders, the cylinder in accordance with the invention is elongated in shape and includes a movable piston attached to one end of a piston rod. However, to avoid the use of external structure and to make best use of the above-described structure of the cylinder head, a fluid transfer tube and hollow piston rod are employed within the cylinder. The tube extends from the cylinder head through the center of the piston and into the interior of the piston rod. The piston rod features at least one port located near the piston to enable fluid flow between the interior area of the piston rod and the interior area of the cylinder surrounding the piston rod. This creates an internal fluid path that extends from the cylinder head, through the transfer tube, through the interior of the piston rod, and then into an area of the cylinder surrounding the piston rod. In said area, the fluid can apply pressure to a first surface of the piston.

The cylinder head additionally includes a port through which fluid can be transferred directly from the cylinder head to an area located within the cylinder where the fluid can apply pressure to a second surface of the piston. The fluid flow to the above-noted port or to the transfer tube is controlled by the main control valve.

In the preferred embodiment, the main control valve is a spool-type valve that is preferably controlled by two pilot valves that are each operated by a dedicated solenoid. Both pilot valves and both solenoids are located in the cylinder head at a location where they are easily serviceable.

The electrical wiring to the solenoids extends out of the cylinder head and is operatively connected to a remotely-located control switch. In this manner, electrical actuation of the control valve structure may be achieved by an operator through actuation of a switch.

In a first embodiment of the invention, one hydraulic fluid supply line/hose is employed to connect the cylinder to a source of pressurized fluid, such as a pump. A second fluid return line/hose is used to connect the cylinder to a fluid reservoir. The latter line/hose inwardly contains the wires that connect the solenoids to the operator-actuated control switch and thereby also functions to protect the wires from damage.

To ensure the desired direction of fluid flow, the cylinder head preferably also includes two pilot-operated check valves. One valve is in the fluid path that leads to the cylinder area adjacent the first surface of the piston, and the other valve is in the fluid path that leads to the cylinder area adjacent the second surface of the piston. Preferably, when one pilot-operated check valve is opened to allow the flow of pressurized fluid, the other pilot-operated check valve will also be opened to provide a return path for displaced fluid. Also in the preferred embodiment, each of the pilot-operated check valves can be fluid locked into a closed position to maintain the piston in a stationary position when the control valve is in a neutral condition.

As noted previously, the second embodiment of the invention is a hydraulic cylinder that is substantially self-contained. This is achieved by including a fluid reservoir, pump, and motor within the cylinder head. As a result, no hydraulic lines extend outwardly from the cylinder. In a preferred form of this embodiment, the fluid reservoir is a cylindrical container. Preferably, the pump and motor are located within the reservoir where they can be cooled by the fluid within the reservoir.

The reservoir also functions to maintain pressure on the contained fluid and can expand or contract in order to accommodate changes in the amount of fluid contained within the reservoir. In the preferred embodiment, this is achieved by the inclusion of an expansible or movable portion of the reservoir, such as a bellows, elastic bag or piston that enhances the ability of the reservoir to expand or contract.

By encasing the hydraulic cylinder's main control valve and other fluid-related components within the cylinder head, the components are protected from damage. Also, in the embodiments of the invention described herein, many or all of the exterior hoses and fittings required for the hydraulic system are eliminated. As a result, the invention provides a hydraulic cylinder that avoids most of the problems of the prior art. Furthermore, the hydraulic cylinder has a shape and space envelope similar to most conventional units. In many cases, this allows the invention to be directly substituted for a conventional hydraulic cylinder.

DETAILED DESCRIPTION OF THE DRAWINGS

Figure 1:
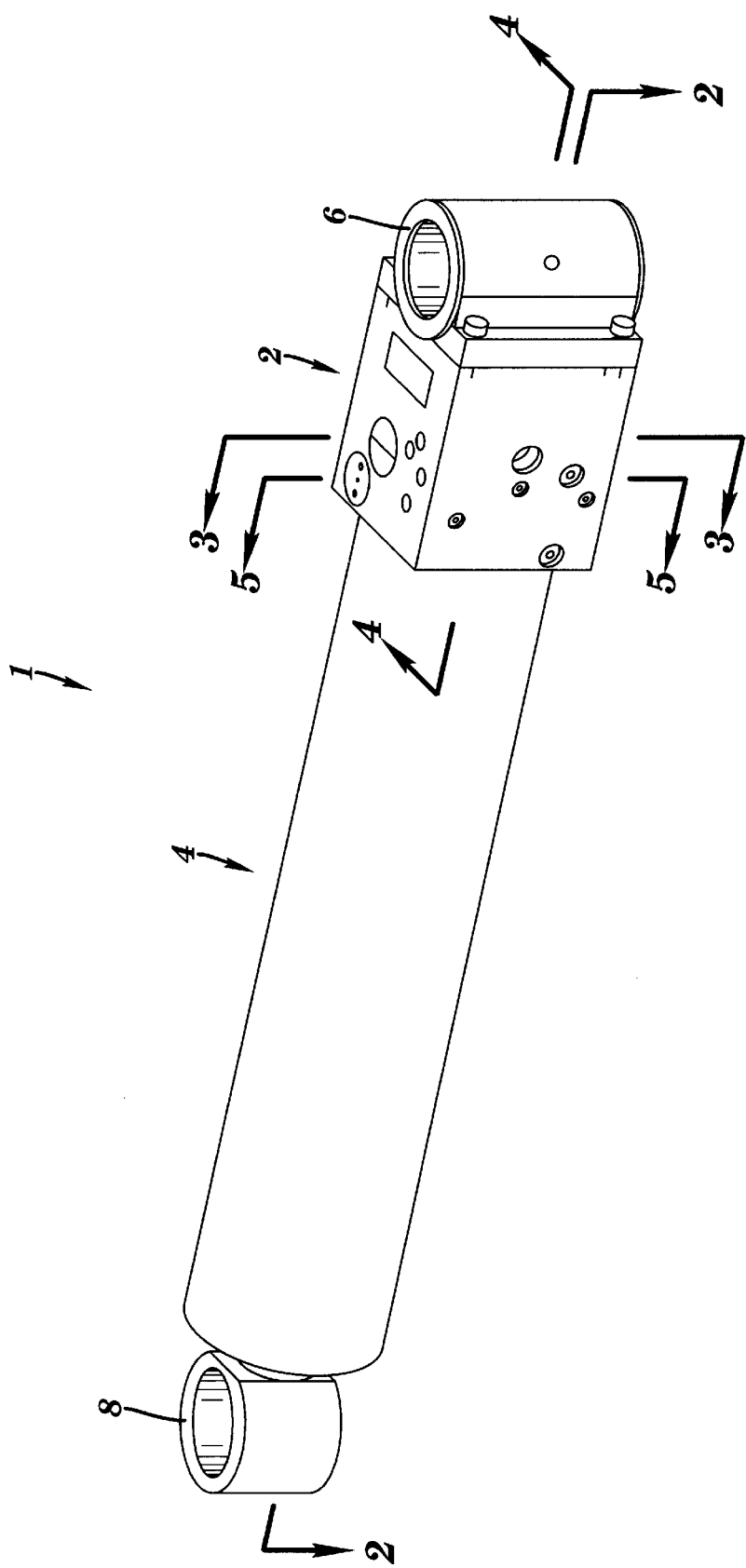
FIG. 1 is a perspective view of a first embodiment of a hydraulic cylinder in accordance with the invention.

Referring now to the drawings in greater detail, wherein like characters refer to like parts throughout the several figures, there is shown by the numeral 1, a first embodiment of a hydraulic cylinder in accordance with the invention.

The cylinder includes a cylinder head portion 2 (also known as a cylinder head) and a body portion 4. Forming an end of the cylinder head portion is a clevis 6. The clevis is a tubular member designed to be secured to a portion of a machine, such as a pivoting arm of a backhoe (not shown). A second clevis 8 is shown at the opposite end of the cylinder 1 from the clevis 6. The clevis 6 would normally be secured to a machine in a manner whereby action of the cylinder will cause a change in distance between clevis 6 and a movable member to which clevis 8 is secured.

Figure 2:
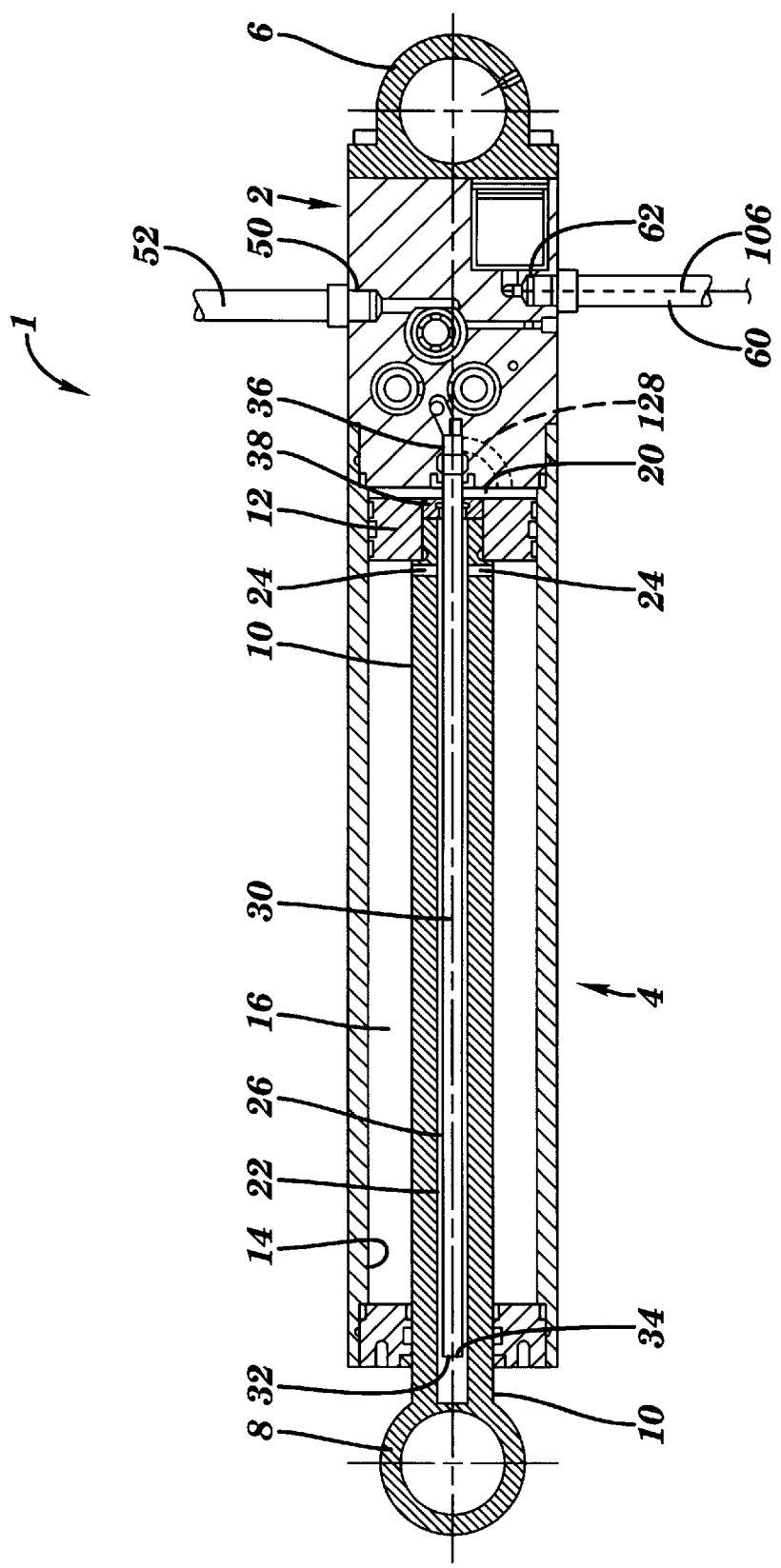
FIG. 2 is a cross-sectional view of the cylinder shown in FIG. 1 and taken at plane 2-2 of FIG. 1. In this view, portions of the hoses attached to the cylinder are also shown.

FIG. 2 provides a cross-sectional view of the cylinder 1. In this view, one can see that the clevis 8 is located at a first end of a piston rod 10. A piston 12 is secured to a second end of the piston rod 10. The piston is capable of sliding, in a substantially sealing manner, along the cylinder's interior wall 14 in a direction parallel to the cylinder's longitudinal axis. FIG. 2 shows the hydraulic cylinder 1 in a substantially fully-retracted position wherein the piston is located proximate its closest point to the cylinder head portion 2.

As also shown in FIG. 2, within the body portion 4 of the cylinder is a first interior cavity or area 16 that is located to the left of the piston, and a second interior cavity or area 20 located to the right of the piston. Upon the appropriate application of hydraulic force, as will be more fully described shortly, the piston can be caused to move to the left so as to reduce the total volume of area 16 and increase the total volume of area 20. When the piston moves to the left, the distance between clevis 6 and clevis 8 will increase. Once the piston has been moved to the left of the position shown, reversing the fluid flow will cause the piston to move back to the right.

One should also note in FIG. 2 that the piston rod 10 is a hollow tube that has an interior wall 22. The piston rod includes a plurality of outlet ports 24, located adjacent to the bottom of the piston, so that they will always be located within area 16. The ports 24 function to connect the interior area 26 of the piston rod (the area bounded by wall 22) with area 16 of the body portion of the cylinder.

Located partially within the interior area 26 of the piston rod is a hollow transfer tube 30. The tube includes an opening 32 at its bottom end 34. The opening 32 opens into the interior area 26 of the piston rod. The top end 36 of the transfer tube is fixedly secured to the cylinder head portion 2. One should note that the transfer tube extends through a seal 38 located in the center of the piston. Since the piston slides on the tube, the seal is preferably made of a low friction material, such as TEFLON.

Figure 3:
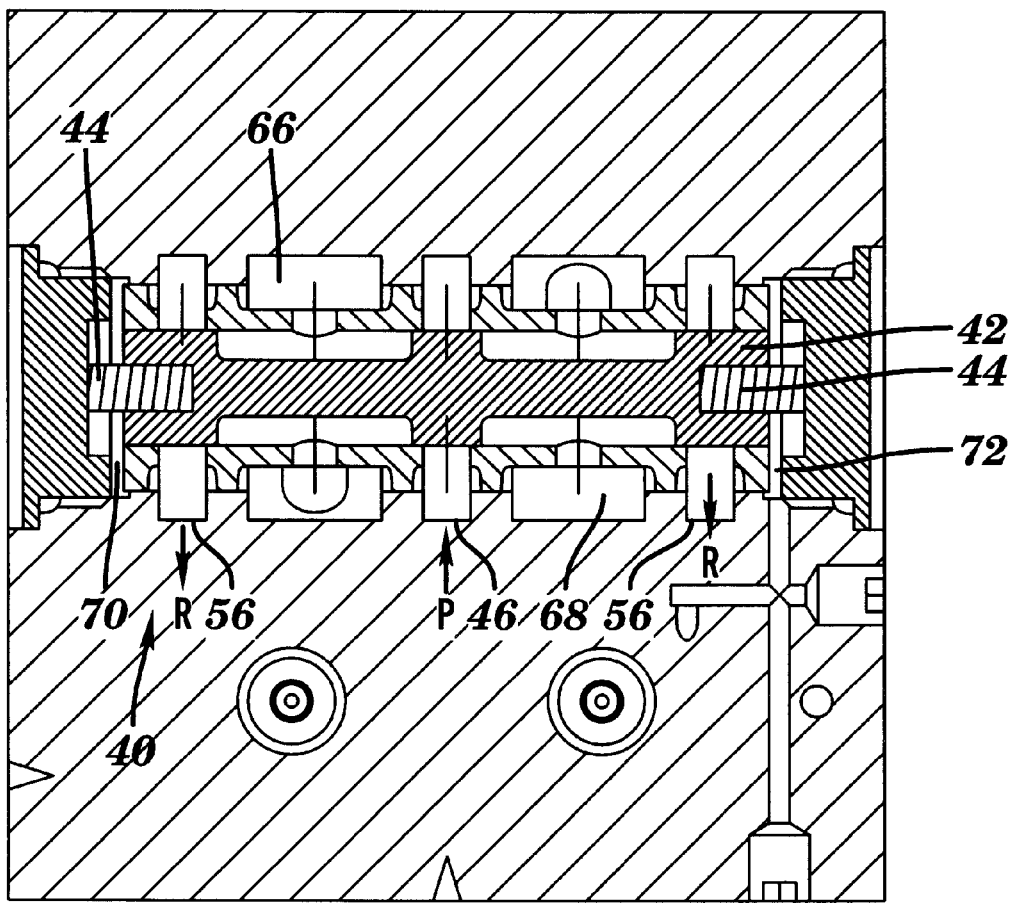
FIG. 3 is a first cross-sectional view of the head portion of the cylinder shown in FIG. 1, taken at plane 3-3 of FIG. 1.
Figure 4:
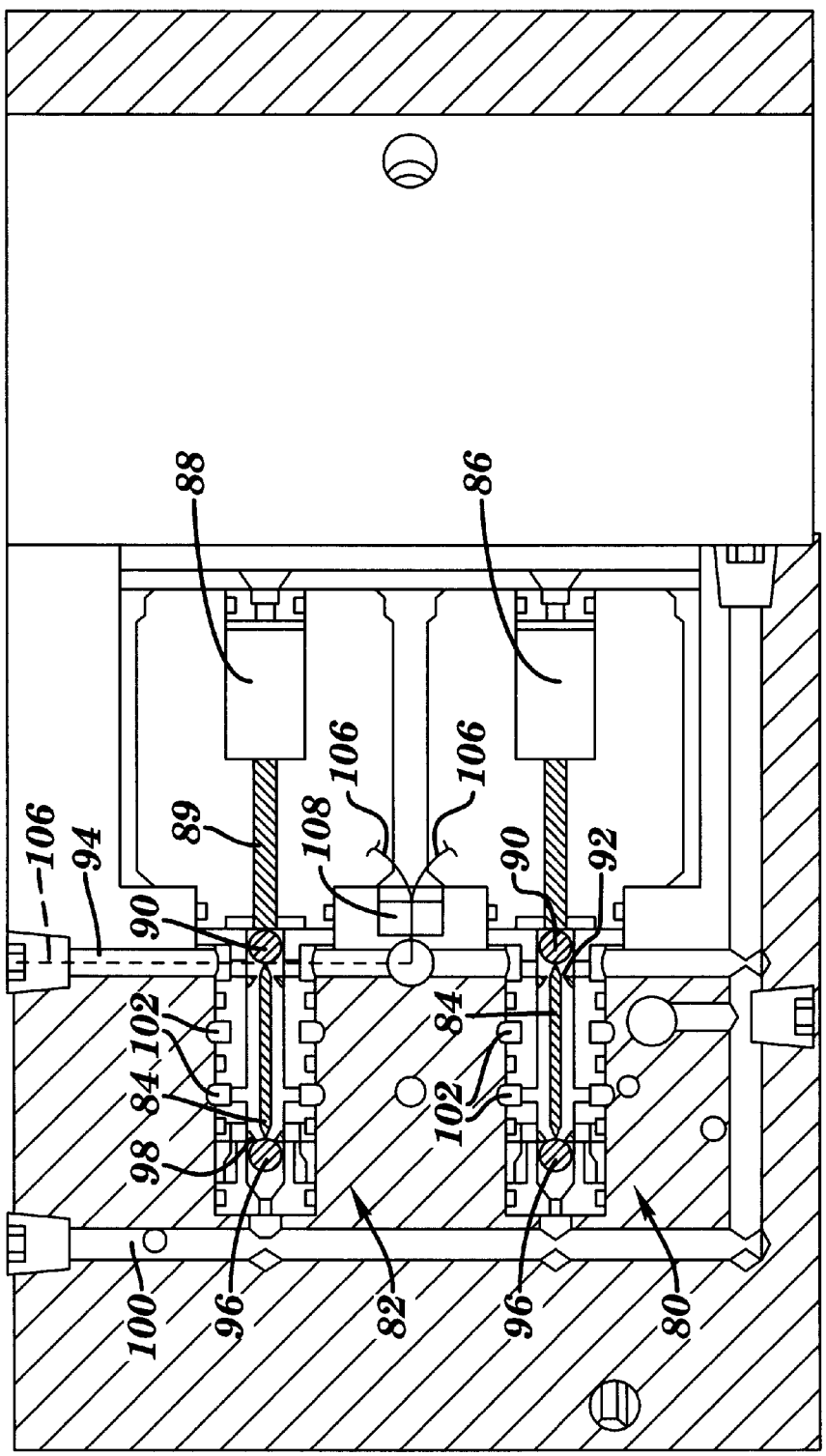
FIG. 4 is a second cross-sectional view of the head portion of the cylinder shown in FIG. 1, taken at plane 4-4 of FIG. 1.
Figure 5:
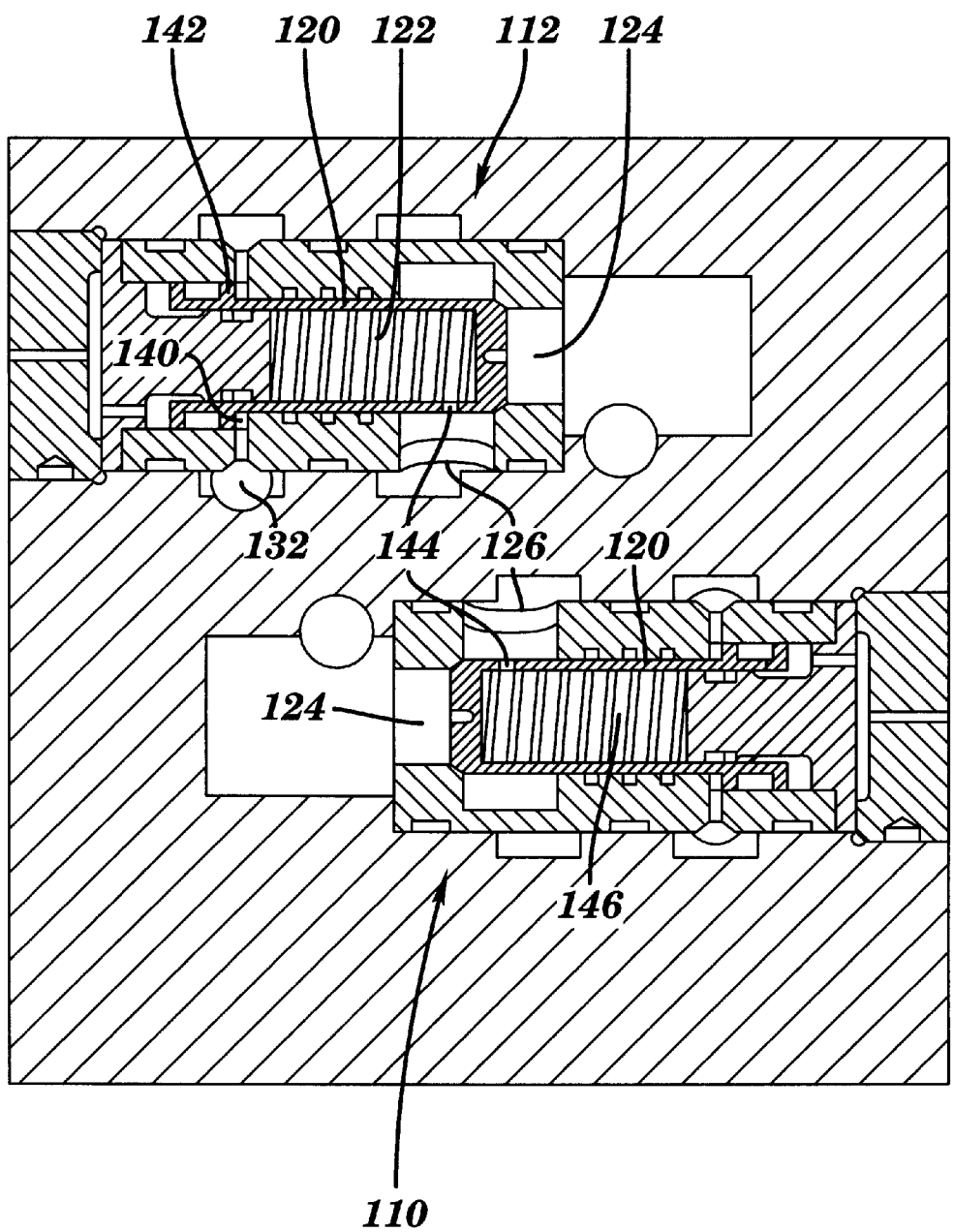
FIG. 5 is a third cross-sectional view of the head portion of the cylinder shown in FIG. 1, taken at plane 5-5 of FIG. 1.
Figure 6:
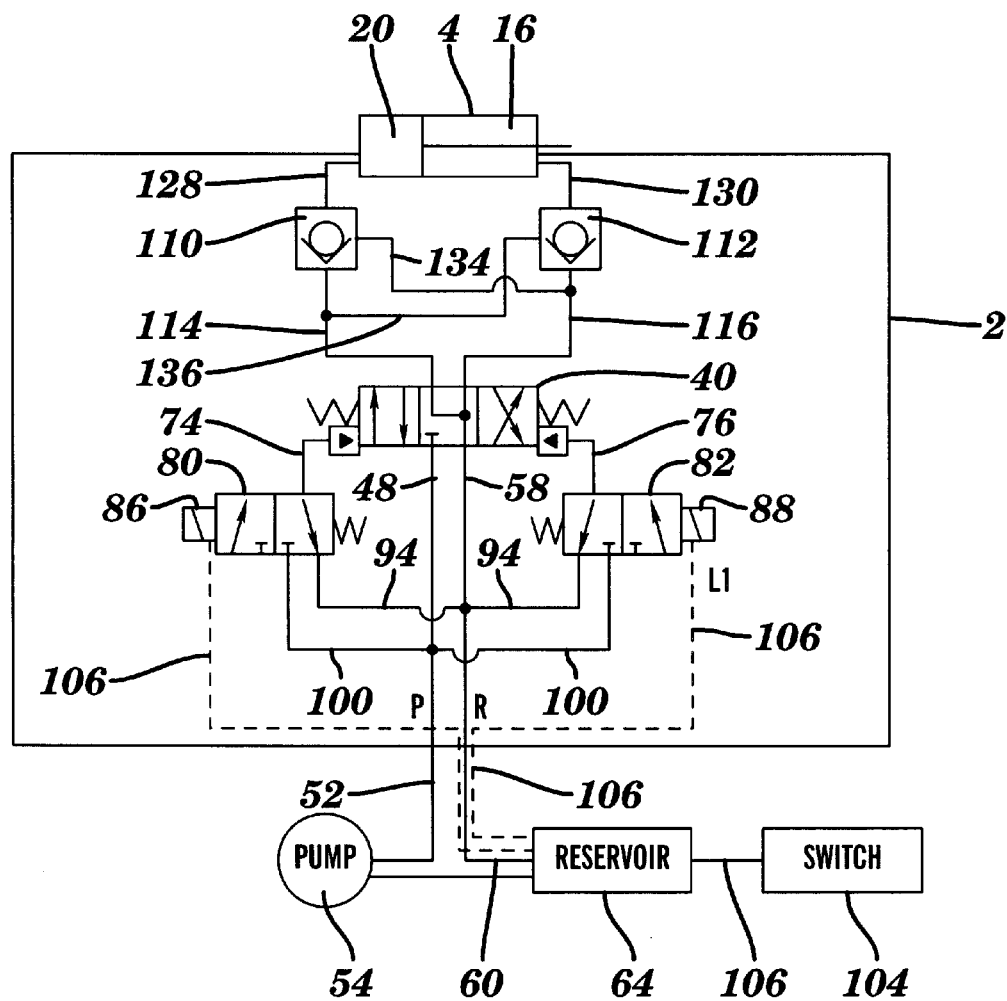
FIG. 6 is a flow diagram for the cylinder shown in FIG. 1. The figure also shows how the cylinder is connected to various exterior components.

In FIGS. 3–5, different cross-sections of the cylinder head are provided to give the reader an understanding of the different components in the cylinder head. While most of the flow paths between components are shown in the various detailed drawings, FIG. 6 provides a standard symbol flowchart for the cylinder in which all of the flow paths are depicted. It should be noted that the cylinder head is depicted in FIG. 6 as box 2 and contains all of the flow paths shown within said box.

FIG. 3 provides a first cross-sectional view of the cylinder head portion 2. In this view, one can see the main control valve 40. The valve is a conventional spool valve and includes a spool, also known as a slide, 42 that is centered by springs 44. The valve includes a center-located port 46 through which pressurized fluid can flow into the valve. The port is continuous with a passage 48 in the cylinder head that leads to inlet port 50, located on the side of the cylinder head (note FIGS. 2 and 6). Connected to port 50 is a high pressure fluid hose 52. The hose is shown in FIG. 6 as being connected to the outlet of a high-capacity pump 54.

The valve also includes two ports 56 for the return flow of fluid. The ports 56 are connected to an interior passage 58 in the cylinder head. Passage 58 leads to an exterior hose 60 secured to outlet port 62 in the cylinder head (note FIGS. 2 and 6). As shown in FIG. 6, hose 60 leads to a fluid reservoir 64 that supplies fluid to the previously noted pump 54.

The valve further includes a first cylinder port 66 and a second cylinder port 68. These ports eventually lead to the areas 16 and 20 in the body portion of the cylinder, wherein fluid flow via these ports will cause piston 12 to move. A fuller description of the flow path will be described in conjunction with a description of the other components of the cylinder head.

Prior to describing how fluid is directed into the body portion of the hydraulic cylinder, it is important to understand the mechanism that causes movement of the control valve's spool 42. At each end of the spool is an area 70, 72. Each area is connected by an interior passage 74 or 76 in the cylinder head (note FIG. 6) to an associated pilot valve 80 or 82. The pilot valves are shown in FIG. 4.

FIG. 4 provides a second cross-sectional view of the cylinder head in which a different portion of the cylinder head is viewable. In this view, one can see that the two pilot valves 80, 82 are structurally identical and are located in a side-by-side relation. The pilot valves are simple in design and make use of a movable center rod 84 that has a triangular cross-section. Each pilot valve is operated by an associated solenoid 86 or 88.

When either solenoid is electrically actuated, the solenoid's plunger 89 is caused to move to the left. The plunger pushes a ball 90 onto a seat 92, thereby closing off the center of the pilot valve from passage 94. Passage 94 connects to passage 58, the primary line for the return flow of fluid to the reservoir.

When ball 90 moves to the left, it pushes rod 84 to the left. As a result, the tip of rod 84 pushes a ball 96 off an associated seat 98 located in an inlet to passage 100. Passage 100 connects to passage 48, the primary line in the cylinder head portion that carries pressurized fluid from the pump. Therefore, when ball 96 is unseated, pressurized fluid is allowed to flow into the body of the associated pilot valve. Since rod 84 has a triangular cross-section and the center bore of the valve body has a round cross-section, fluid can flow through the valve by passing between the sides of the rod and the circular wall of the valve's bore. As can be seen in FIG. 4, the valve has two ports 102 that open into the valve's center bore. When either of balls 90 or 96 are unseated, the fluid path will be into or out of ports 102, through the valve's bore, and then past the unseated ball. In valve 80, both of its ports 102 are connected to fluid passage 74, which leads to area 70 of the main control valve. In valve 82, both of its ports 102 lead to fluid passage 76, which leads to area 72 of the main control valve. In this manner, pressurized fluid can be selectively diverted by the pilot valves to one of the areas 70 or 72 of the main control valve to cause a shifting of slide 42.

When a solenoid is de-energized, the solenoid's plunger 89 moves to the right. This allows ball 96 to move into its seat and ball 90 to move off its seat. As a result, the flow of pressurized fluid from passage 100 is stopped and the interior of the valve is opened to passage 94, the fluid return passage. In this manner, when one solenoid is energized, the associated pilot valve sends pressurized fluid to one end of slide 42. As the slide moves, the displaced fluid from the opposite end of the slide can flow back to the return line 100 via the pilot valve associated with the non-energized solenoid.

The solenoids 86, 88 are conventional in design and are electrically connected to a user-actuable switch or similar control 104 (shown in FIG. 6) via wires 106. In the preferred embodiment, the wires 106 from the solenoids pass through a seal 108, enter passage 94 and then continue through the fluid return passage 58 in the cylinder head. The wires then exit the cylinder head via the center of the fluid return port 62 and hose 60. It should be noted that hose 60 is preferably a standard hose, and that wires 106 run through the hose's interior. The wires follow the fluid path through hose 60 and thereby enter the fluid reservoir 64 through the connection for hose 60. The wires then exit the reservoir, preferably via the reservoir's vent tube (not shown), and continue to the switch/control 104.

Alternatively, but not shown, the wires 106 can run through the pressurized fluid path and exit hose 52 at its connection to the pump. As another alternative that is not shown, a 'T'-shaped coupling can be placed in port 62 of the cylinder head, with hose 60 connecting to one arm of the 'T' and wires 106 passing through a seal in the other arm of the 'T'. In another alternative that is not shown, the wires can extend through a dry passage in the cylinder head and exit an access port (not shown) in the cylinder head. In the latter two cases, the wires would then run directly to the switch/controller 104 via any desired route.

FIG. 5 shows another cross-sectional view of the cylinder head 2. At the location where this cross-section is taken, one can see first and second identical pilot-operated check valves 110 and 112. Pilot-operated check valve 110 is located at the end of a passage 114, the passage that leads to the first cylinder port 66 of the main control valve 40. Pilot-operated check valve 112 is located at the end of passage 116, the passage that leads to the second cylinder port 68 of the main control valve (note FIG. 6).

Each of pilot-operated check valves 110 and 112 includes a poppet 120 that is outwardly-biased by a spring 122. The end-located port 124 of each valve connects to one of the passages 114 or 116. Each pilot-operated check valve also includes a side-located port 126. In pilot-operated check valve 110, port 126 leads to passage 128, the passage that leads to area 20 in the body portion of the cylinder. In pilot-operated check valve 112, port 126 leads to passage 130, the passage that leads to area 16 in the body portion of the cylinder.

Additionally, each pilot-operated check valve includes a port 132 that is connected to one of passages 134 or 136 (note FIG. 6). Passage 134 taps off passage 116 and passage 136 taps off passage 114 (note FIG. 6). Port 132 leads to a small area 140 adjacent the body of the poppet and that is bounded on one side by a flange portion 142 of the poppet. Pilot control of the check valve occurs when the main control valve is actuated and causes pressurized fluid to be sent through port 132 from one of the fluid passages 114 or 116 via the associated fluid passage 136 or 134. The pressurized fluid will apply pressure on the poppet's flange portion 142. This will cause the poppet to move down, i.e.—compress the spring 122 and uncover ports 124 and 126. When this occurs, fluid is allowed to flow into port 126 and out port 124. Therefore, pilot operation refers to operation of the valve through the action of another valve or mechanism.

The poppet of each pilot-operated check valve includes a side-located weep hole 144 that faces port 126. The weep hole leads to an otherwise sealed interior area 146 of the poppet. When both pilot-operated check valves are closed, such as when the main control valve is in a neutral position, fluid can flow into the interior area of the poppet via port 126 and the weep hole. The fluid fills the interior area of the poppet and, in combination with the spring, forces the end of the poppet against port 124. This prevents any fluid flow through the pilot-operated check valve, thus the position of the piston in the cylinder is maintained against a load.

The function of the cylinder 1 relies on the interaction between the various previously described components. The following steps/actions would occur to cause the piston rod 10 to move outwardly from the position shown in FIGS. 1 and 2, so as to increase the distance between clevis 6 and clevis 8. The following description will make use of both the detailed views and the flow diagram provided in FIG. 6.

The first step involves a user actuating the user-actuable control/switch 104. The switch 104 may actually be a single switch, or a series of connected components, such as a switch or joystick connected to a microprocessor, which is then connected to wires 106. Once actuation has occurred, an electrical signal is sent through a particular wire within the wire bundle 106. The signal travels to solenoid 86 and causes the solenoid's plunger 89 to move to the left. This pushes ball 90 into seat 92, thereby closing off the interior of the valve from the fluid return passage 94. When ball 90 moved to the left, it also pushed rod 84 of pilot valve 80 to the left. As rod 84 moves to the left, its left tip pushes ball 96 off seat 98. This allows pressurized fluid to flow from passage 100, around ball 96, into the body of valve 80 and then exit valve 80 via ports 102. Both of ports 102 of valve 80 lead to fluid passage 74, through which the fluid passes and then enters area 70 of the main control valve. The fluid applies pressure to the left end of the control valve's slide 42 and causes said slide to move to the right. It should be noted that as the slide moves to the right, fluid leaves area 72 of the main control valve, flows through passage 76 and into the body of pilot valve 82 via its ports 102. Fluid leaves valve 82 by flowing along the exterior of rod 84, past seat 92 (note, ball 90 of valve 82 is not pressed against its seat since solenoid 88 is not energized), into passage 94, and then into reservoir 64 via the cylinder head's fluid return passage 58 and hose 60.

Once slide 42 has moved a sufficient distance to the right, fluid flow is enabled from port 46, through the body of the control valve, and out the valve's port 66. The pressurized fluid then flows through passage 114 to port 124 of pilot-operated check valve 110. The fluid applies pressure to the end of the pilot-operated check valve's poppet 120 and pushes said poppet into the valve, compressing spring 122 and forcing a portion of the fluid located within the poppet out the poppet's weep hole 144. This eventually causes the end of the poppet to uncover port 126 and allow pressurized fluid to travel into passage 128. As can be seen in FIG. 2, passage 128 extends through the cylinder head and opens into area 20 of the cylinder's body portion. The fluid flows through passage 128 and into area 20. The pressurized fluid then applies pressure onto the top face of the piston 12 and pushes the piston in a direction away from the cylinder head portion 2. The outer periphery of the piston slides on the body portion's interior wall 14, as the center of the piston slides on the transfer tube 30.

It should be noted that the pressurized fluid located in passage 114 will also flow into passage 136. The fluid will then go through port 132 of pilot-operated check valve 112 and into said valve's area 140. Once in area 140, the fluid applies pressure to the flange portion 142 of the valve's poppet 120. This causes said poppet to move away from its end-located port 124 and to compress its spring 122. As the poppet compresses the spring, fluid is expelled from the interior of the poppet via its weep hole 144. The poppet continues to move until a flow path between port 124 and port 126 of valve 112 is established. As the piston 12 moves away from the cylinder head portion 2, the volume of area 20 will increase and the volume of area 16 will decrease. The displaced fluid from area 16 flows through ports 24 in the piston rod and into the rod's interior area 26. From there, the fluid flows into opening 32 of the transfer tube and goes through the transfer tube. End 36 of the transfer tube is connected to passage 130 in the cylinder head, whereby the fluid flows from the transfer tube and into passage 130. The fluid can then flow through the now open pilot-operated check valve 112 and into passage 116. From passage 116, the fluid flows through port 68 of the main control valve, where it then is diverted into the fluid return passage 58 via port 56. The fluid can then flow from passage 58 to hose 60, where it then flows back into the reservoir 64.

Once piston 12 has moved the desired distance to the left, the control/switch 104 is moved into a neutral position. This causes a stoppage of the electrical signal to solenoid 86. As a result, the plunger 89 of solenoid 86 pulls back to the right. This allows ball 96 to move into its seat and thereby seal the inlet to passage 100. The same plunger movement allows ball 90 to move off its seat, thereby allowing fluid from passage 74 to flow past rod 84 and into passage 94. The fluid then returns to the reservoir via return passage line 58 and hose 60. Since there is now equal pressure being applied to both ends of the main control valve's spool 42, springs 44 will cause the spool to become centered in the valve. This stops the flow of pressurized fluid to port 124 of pilot-operated check valve 110 and port 132 of pilot-operated check valve 112. With pressure no longer being applied to the poppet of either pilot-operated check valve, the poppets are forced outwardly by their associated springs 122 and each blocks its associated port 126. These actions effectively lock the piston 12 at the desired location within the cylinder's body portion.

To ensure that the piston 12 does not move once pressure is no longer being applied to the piston by the fluid, a fluid locking mechanism for the pilot-operated check valves is employed. When the weep hole 144 of either pilot-operated check valve is aligned with an adjacent port 126, a small amount of fluid will flow through the weep hole to pressurize the interior area of the poppet. As a result, the poppet cannot move to unblock port 126 until significant pressure is applied to the top of the poppet by pressurized fluid from one of the lines 114 or 116, or until fluid pressure is applied to the poppet's flange 142 via port 132.

To reverse the direction of movement of the piston, the above-described procedure is basically repeated, except that this time solenoid 88 is energized. This causes pilot valve 82 to supply pressurized fluid to the main control valve in a manner whereby slide 42 moves to the left. Pressurized fluid then flows out of the control valve, through pilot-operated check valve 112, into passage 130, through the transfer tube, into the interior of the piston rod, and then into area 16 in the body portion of the cylinder via ports 24 of the piston rod.

Figure 7:
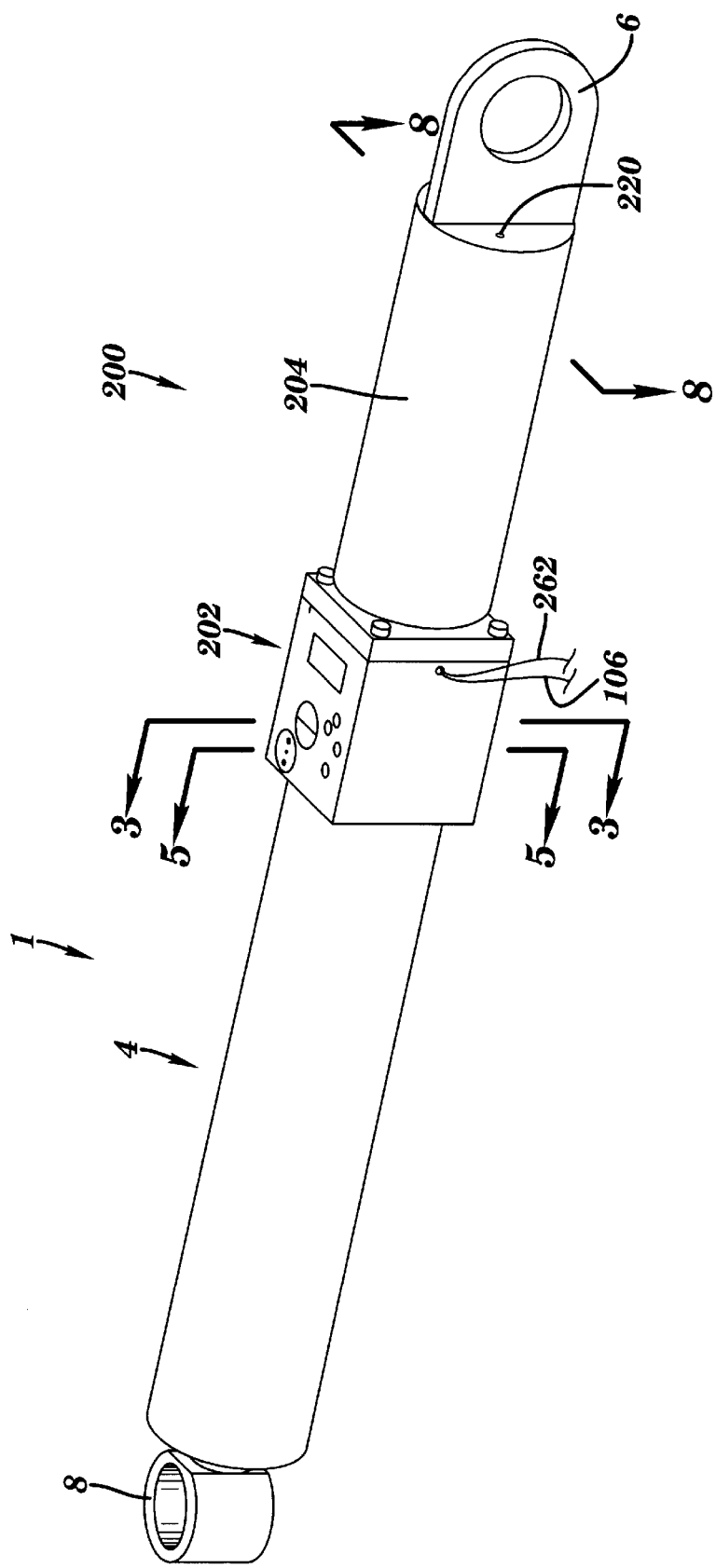
FIG. 7 is a perspective view of a second embodiment of a hydraulic cylinder in accordance with the invention.

FIG. 7 shows a perspective view of a second embodiment of a hydraulic cylinder 200 in accordance with the invention. The body portion 4 of the cylinder is identical to the body portion 4 described in the first embodiment. However, as can be seen in FIG. 7, the head portion 202 of the cylinder, also known as the cylinder head, includes a tubular extension 204 that makes it longer than the cylinder head 2 of the first embodiment of the invention. One should also note the lack of any hydraulic lines or hoses connected to the cylinder. These differences are due to the cylinder being completely self-contained, to the extent that it inwardly contains all of its hydraulic components, including the hydraulic pump and reservoir, as well as a motor that drives the pump.

Figure 8:
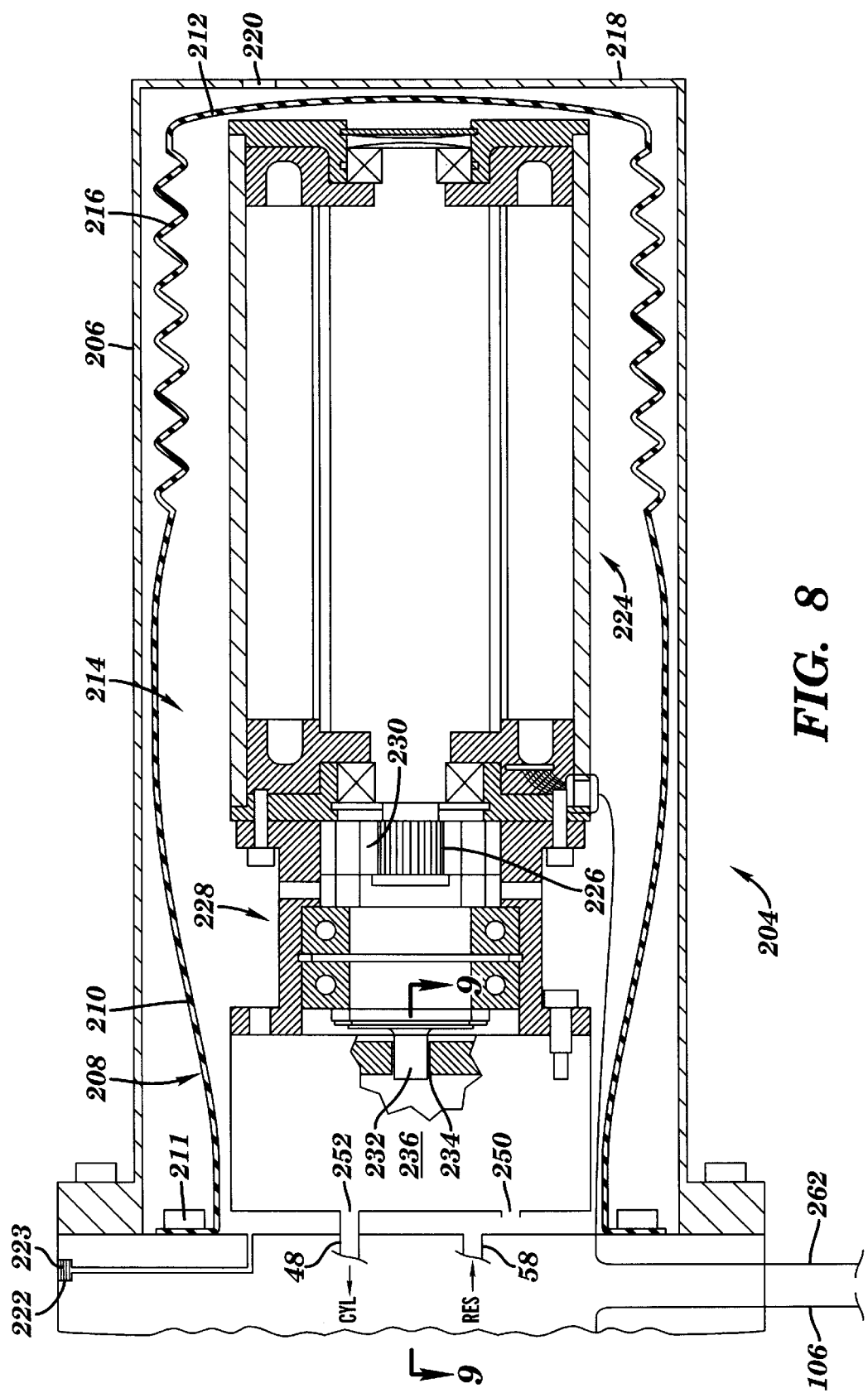
FIG. 8 is a partial cross-sectional view of the end portion of the cylinder shown in FIG. 7, taken at plane 8-8 of FIG. 1.

FIG. 8 provides a partial cross-sectional view of the tubular extension 204. The tubular extension 204 comprises a hollow outer tube 206, preferably of steel, that inwardly contains a fluid reservoir 208. The fluid reservoir is formed by a cylindrical bag/container 210 that is secured to the cylinder head by fasteners 211, has a closed end 212 and surrounds an interior area 214. The reservoir is filled by a quantity of hydraulic fluid (not shown), typically oil. In the preferred embodiment, the bag/container 210 is made of a resilient material, such as nitryl-rubber, and includes a bellows portion 216. Both the resilient material of the reservoir and the bellows function to enable the bag/container 210 to change size, with a concomitant change in interior volume, in response to changes in the amount of fluid contained within the reservoir. It should be noted that while a specific form and method of applying pressure to the fluid by the reservoir is shown, other equivalent structures, such as different forms of bellows, different pressurization mechanisms such as gas or spring-loaded reservoirs, may alternatively be employed.

It should be noted that the primary cause for the volume of liquid within the reservoir to change is due to changes in the amount of the piston rod located within cavity portion 16 of the body of the cylinder (note FIG. 2 for details pertaining to the cylinder's body 2). When the rod is fully extended from the cylinder, the piston will have moved to the left and cavity portion 16 will have its minimum volume. At the same time, the volume of cavity portion 20 (located to the right of the piston) will be at a maximum. One should note that the volume of cavity portion 16 includes the volume of the contained fluid plus the volume of the piston rod located within the cavity portion. Therefore, whenever the piston moves to the left (per FIG. 2), the volume of fluid filling cavity portion 20 must equal the volume of fluid leaving cavity portion 16 plus an amount of fluid equal to the volume of the piston rod leaving cavity portion 16. The make-up fluid to compensate for the volume of the piston rod is stored within the reservoir 206. Therefore, as the piston rod moves outwardly from the cylinder, the reservoir will contract. It should be noted that the reservoir will also include a small quantity of fluid that can make up for minor fluid leakage.

The distal end 218 of the tubular extension 204 includes a vent 220. The vent provides a connection between the area surrounding the bag/container 210 and the ambient environment. In this manner, the vent enables the passage of air to compensate for changes in the exterior volume of the reservoir.

The cylinder head also includes a charging port 222. This port has a removable plug 223 and leads into the reservoir and is used to fill or recharge the system with hydraulic fluid.

In the preferred embodiment, the material of the bag/reservoir 210 continually exerts inward pressure on the fluid contained within the reservoir. In this manner, the fluid in the system is at a positive pressure relative to that of the ambient environment.

Also located within the interior area 214 of the reservoir is a conventional electric motor 224, preferably a brushless DC motor. Connected to the output shaft 226 of the motor is a planetary gearbox 228. The gearbox is also of a conventional design and includes a plurality of gears 230 (only some are shown) and an output shaft 232. The gearbox functions to provide a predetermined difference in rotational speed between its input, from shaft 226 of the electric motor, and its output, the shaft 232. The gearbox housing includes a plurality of holes (not shown) that enable the fluid located within the reservoir to flow into the gearbox and thereby lubricate the gearbox's gears.

Figure 9:
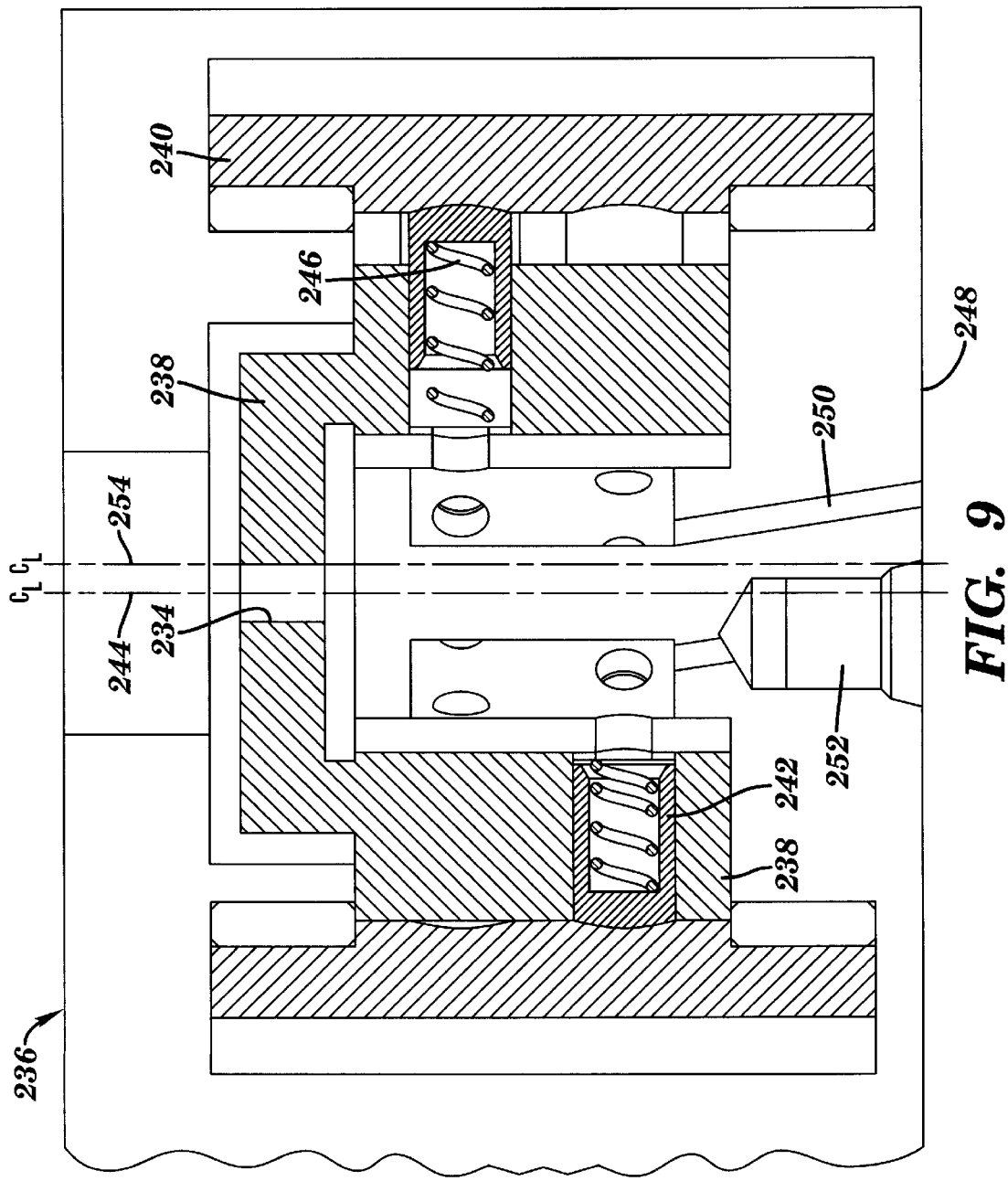
FIG. 9 is a cross-sectional view of the pump, taken at plane 9-9 of FIG. 8.

Output shaft 232 of the gearbox is received within a splined socket or receiver 234 of a radial piston pump 236. The piston pump is of a conventional design and is shown in greater detail in FIG. 9. The pump includes a rotor 238, cam ring 240, and a plurality of pistons 242 that are evenly spaced about the center axis 244 of the rotor. In the preferred embodiment, the pump includes fourteen pistons, with each piston spring-loaded by a spring 246 that biases the piston toward the cam ring.

Located adjacent end 248 of the pump is the pump's inlet port 250 and outlet port 252. One-way valves (not shown) are located adjacent each port. The pistons 242 are arranged so that outward movement of the pistons (away from the center axis of the rotor) draws fluid into the pump from the reservoir via the inlet port 250 and associated one-way valve. Inward movement of the pistons (toward the center axis of the rotor) applies pressure to the fluid contained within the pump, thereby pressurizing the fluid and forcing the fluid out of the pump's outlet port 252 and associated one-way valve. It should be noted that movement of the pistons is achieved through the use of an offset between the center axis of the rotor and the center axis 254 of the cam ring. As the rotor and cam ring rotate together, the offset of the axes causes the distance between adjacent surfaces of the rotor and cam ring to continually change. This creates a reciprocating movement of the pistons as the springs 246 force the pistons to continually contact the adjacent surface of the cam ring.

To the left of the pump, the cylinder head 202 of the cylinder 200 is substantially identical to the cylinder head 2 of the cylinder 1, shown in FIGS. 1–6. However, instead of the return passage 58 connecting to an exterior hose, it leads into the reservoir 206, where the fluid can then be drawn into the pump via inlet port 250. Instead of passage 48 connecting to a hose that leads to an external source of pressurized fluid, it connects to the pump's outlet port 252.

Figure 10:
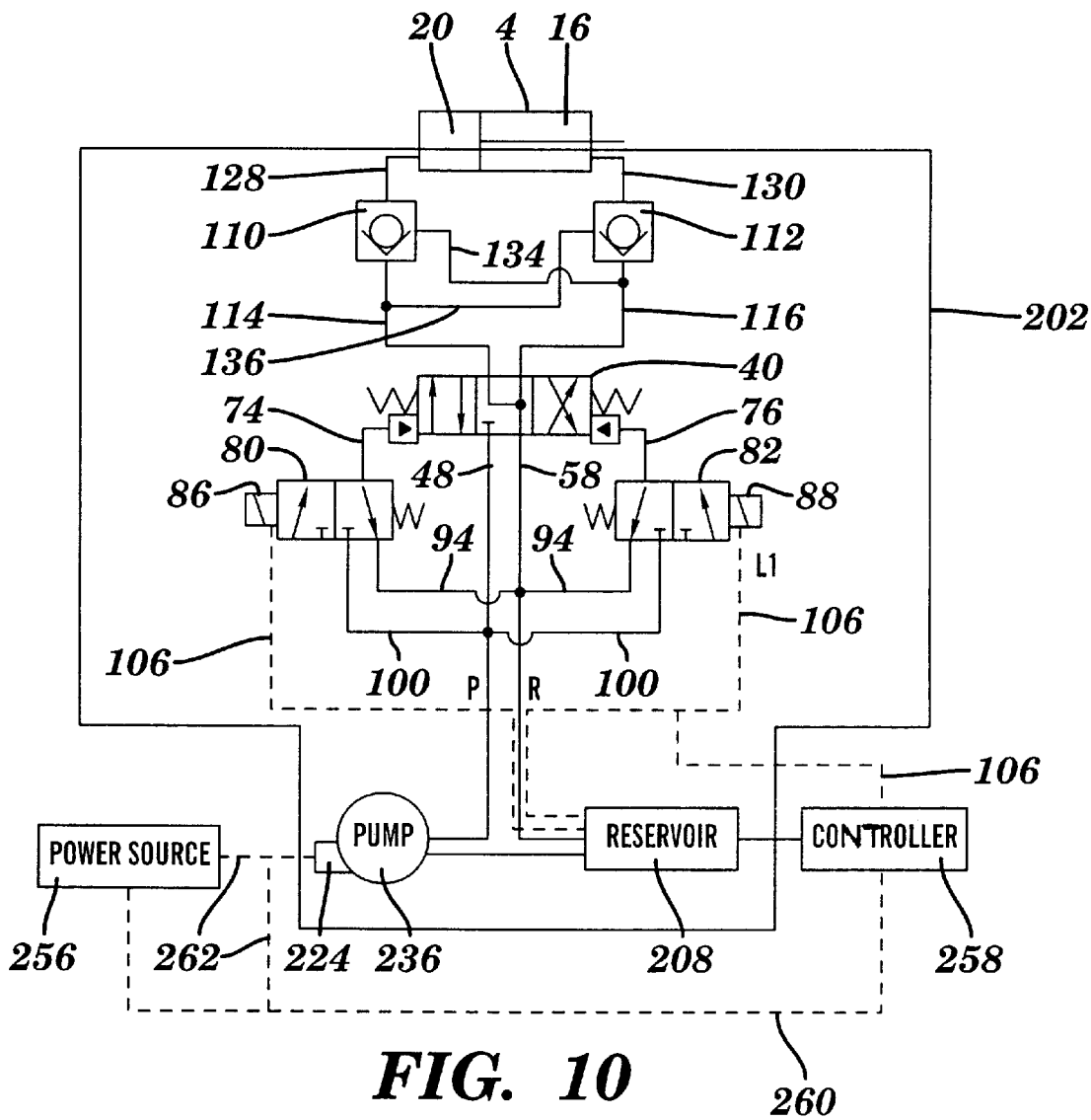
FIG. 10 is a flow diagram for the cylinder shown in FIG. 7. The figure also shows a connection between the cylinder and a remotely-located controller and source of electrical power.

FIG. 10 shows a generalized schematic of the cylinder 200, a power source 256 (such as an engine-driven generator, or a battery), and a remotely-located controller 258. It should be noted that while not individually shown in the detailed drawings, all of the connections/passages shown within the box labeled 202 in the drawing are located within the cylinder head 202.

In operation, when controller 258 is actuated, an electrical signal is sent to one of the solenoids 86 or 88 via wires 106, and the fluid flow in the cylinder head will proceed much in the same manner as described in the first embodiment. The controller is also connected to the power source by wires 260 and the motor 224 via wires 262 whereby operation of the controller will also control the flow of electricity from the electrical power source 256 to the motor 224 via wires 262 and thereby also control the motor's speed. Alternatively, the system may include a pressure sensor that, when it reads a pressure below a predetermined amount, will cause the flow of electricity from the power source 256 to the motor 224. Operation of the motor will drive the pump 236 via the gearbox 228. This causes pressurized fluid to flow into fluid passage 48. The return line 58 will direct the returning fluid into the reservoir 206. The system will preferably include a sensor (not shown) that will stop the flow of electricity to the motor if the system pressure exceeds a predetermined level.

It should be noted that while specific types of valves are shown and described for use in the cylinder head, other functionally-equivalent valves or structures may be substituted in their place. For example, in lieu of using a main control valve that is controlled by two pilot valves, a main control valve that is controlled by one pilot valve, or a control valve that does not require a pilot valve, may alternatively be employed. As another example, other types of pilot mechanisms for the main control valve may be used. The check valves can be replaced by other types of check valves, or can be eliminated if allowed by the conditions of operation.

In the second embodiment of the invention, it should be noted that while a specific type of piston pump is shown and described, many other types of conventional pumps can be alternatively employed. For example, a vane pump, gear pump or non-rotary pump can be employed in place of the pump shown. Furthermore, the use of a gearbox is optional, whereby a motor pump combination that does not require any geared reduction may be employed. Additionally, while a brushless type of electric motor is preferred, other types of motors may be alternatively employed.

The reservoir employed in the second embodiment of the invention can alternatively be replaced with other well-known types of fluid reservoirs. For example, a spring-loaded reservoir can be used. In the latter type of reservoir, a volume of fluid is contained within a cylinder and pressure is maintained through the use of a spring-loaded piston that bears down on the contained fluid. A gas-charged reservoir may also be substituted for the reservoir shown.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

We claim:

1. A hydraulic cylinder comprising:
an elongated body that inwardly contains a piston that is slidable within an interior cavity of said body, wherein said piston divides said cavity into first and second cavity portions, wherein said piston is attached to a first end portion of a piston rod, wherein sliding movement of said piston causes said piston rod to move in a direction parallel to a longitudinal axis of said body; and
a cylinder head located at one end of said body and extending outwardly from said body in a direction substantially parallel to said longitudinal axis of said body, wherein said cylinder head inwardly contains a pump, a motor operatively connected to said pump and to a power source, a fluid reservoir, and a main control valve that is capable of being actuated by a user, wherein when said valve is actuated by a user, pressurized fluid can flow from said pump to said main control valve and then through a passage in said cylinder head and into said first cavity portion.

2. The hydraulic cylinder of claim 1 wherein said cylinder head also contains a pilot valve operatively connected to said main control valve, and wherein said cylinder head additionally contains an electrically-actuable solenoid connected to said pilot valve, wherein said solenoid can control the operation of said pilot valve, and wherein an electrical wire extends out of said cylinder and electrically connects said solenoid to a user-actuable controller, wherein when a user actuates said controller, an electrical signal will be sent to said solenoid via said wire and cause said solenoid to affect said pilot valve in a manner whereby said pilot valve will affect said main control valve to cause pressurized fluid to be sent into said first cavity portion whereby said fluid will apply pressure on a surface of said piston.

3. The hydraulic cylinder of claim 1 wherein said cylinder head also inwardly contains a pilot-operated check valve, wherein said pilot-operated check valve is in a fluid path leading to said first cavity portion.

4. The hydraulic cylinder of claim 1 wherein said piston rod includes a hollow interior area and a port that connects said hollow interior area with an area exterior to the piston rod within said second cavity portion, and wherein a hollow transfer tube extends through a bore in said piston and into said hollow interior area of said piston rod, wherein said transfer tube is connected to said cylinder head and functions to transfer fluid between said main control valve and said second cavity portion.

5. The hydraulic cylinder of claim 4 further comprising a seal in said bore in said piston, wherein said piston is capable of moving relative to said transfer tube wherein said seal functions to prevent fluid from passing around said transfer tube and traveling through said bore from said first cavity portion to said second cavity portion.

6. The hydraulic cylinder of claim 1 wherein a first clevis is secured to said cylinder head and a second clevis is secured to a second end portion of said piston rod.

7. The hydraulic cylinder of claim 1 wherein the fluid reservoir is in the form of a resilient bag.

8. The hydraulic cylinder of claim 1 wherein the fluid reservoir includes an expansible bellows section that enables an internal volume of the fluid reservoir to change to accommodate changes in the amount of fluid retained within said reservoir.

9. The hydraulic cylinder of claim 1 wherein the pump is in the form of a piston pump.

10. A hydraulic cylinder comprising:
an elongated body that inwardly contains a piston that is slidable within an interior cavity of said body, wherein said piston divides said cavity into first and second cavity portions, wherein said piston is attached to a portion of an elongated piston rod, wherein sliding movement of said piston causes said piston rod to move in a direction parallel to a longitudinal axis of said body; and
a cylinder head located at one end of said body and extending outwardly from said body in a direction substantially parallel to said longitudinal axis of said body, wherein said cylinder head inwardly contains a fluid reservoir, a pump, a motor operatively connected to said pump and capable of being connected to a power source, and a main control valve, wherein said pump is capable of providing pressurized fluid to said main control valve, wherein said main control valve can direct fluid from said first cavity portion into said fluid reservoir, and wherein said pump has a fluid inlet that is capable of receiving fluid from said fluid reservoir, wherein said main control valve is capable of being actuated through the actions of an electrical mechanism, wherein said mechanism is electrically connected to a control located exterior to said cylinder, wherein when said valve is actuated by said electrical mechanism in a predetermined manner, pressurized fluid will flow from said main control valve, through a passage in said cylinder head, and into said second cavity portion.

11. The hydraulic cylinder of claim 10 wherein said piston rod includes a hollow interior area and a port that connects said hollow interior area to an area exterior to the piston rod within said second cavity portion, and wherein a hollow transfer tube extends through a bore in said piston and into said hollow interior area of said piston rod, wherein said transfer tube is connected to said cylinder head in a manner whereby fluid can travel between said main control valve and said second cavity portion via said transfer tube.

12. The hydraulic cylinder of claim 10 wherein said cylinder head also contains first and second pilot valves operatively connected to said main control valve, wherein said electrical mechanism is in the form of first and second solenoids, wherein said first pilot valve is operatively connected to said first solenoid and said second pilot valve is operatively connected to said second solenoid, wherein when said control located exterior to said hydraulic cylinder is actuated by a user in a predetermined manner, said second solenoid will become energized and affect said second pilot valve to cause pressurized fluid to be directed to said main control valve and thereby cause said main control valve to direct pressurized fluid into the second cavity portion and cause said piston to move within said body and thereby cause fluid to leave the first cavity portion and flow into said reservoir via said control valve.

13. The hydraulic cylinder of claim 12 wherein said first pilot valve is hydraulically-connected to said main control valve in a manner whereby it can cause said main control valve to direct pressurized fluid into said first cavity portion.

14. The hydraulic cylinder of claim 10 wherein said cylinder head also contains first and second pilot-operated check valves, wherein said first pilot-operated check valve is in a fluid path leading to said first cavity portion, and wherein said second pilot-operated check valve is in a fluid path leading to said second cavity portion, wherein pressurized fluid can be selectively directed to either of said pilot-operated check valves by said main control valve and cause the pilot-operated check valve receiving pressurized fluid to open and allow said fluid to continue to one of said cavity portions of said body.

15. The hydraulic cylinder of claim 14 wherein when pressurized fluid is being directed to one of said pilot-operated check valves by said main control valve, pressurized fluid will also be directed to the other of said pilot-operated check valves, wherein said other of said pilot-operated check valves includes a fluid-actuated opener that will cause said other of said pilot-operated check valves to open and thereby allow displaced fluid from one of said cavity portions to flow through said other of said pilot-operated check valves and be directed to said fluid reservoir.

16. The hydraulic cylinder of claim 14 wherein each of said pilot-operated check valves includes a fluid-operated locking system that can prevent the valve from opening.

17. The hydraulic cylinder of claim 16 wherein each of said pilot-operated check valves includes a movable poppet, and wherein said locking system is in the form of a weep hole located in a side portion of each of said poppets, wherein when said weep hole is exposed to fluid in a passage leading to one of said cavity portions, said weep hole will allow fluid to flow into an otherwise sealed interior area of the associated poppet, wherein once said sealed area of said poppet is filled, movement of the poppet is thereby prevented due to the incompressibility of the fluid located within the poppet.

18. The hydraulic cylinder of claim 10 wherein the fluid reservoir is in the form of a resilient bag.

19. The hydraulic cylinder of claim 10 wherein the fluid reservoir includes an expansible bellows section that enables an internal volume of the fluid reservoir to change in response to changes in the amount of fluid retained within said reservoir.

20. The hydraulic cylinder of claim 10 wherein the pump is in the form of a piston pump.

21. A hydraulic cylinder comprising:
an elongated body that inwardly contains a piston that is slidable within an interior cavity of said body, wherein said piston divides said cavity into first and second cavity portions, wherein said piston is attached to a piston rod, wherein sliding movement of said piston causes said piston rod to move in a direction parallel to a longitudinal axis of said body; and
a cylinder head located at one end of said body, wherein said cylinder head inwardly contains a pump, a motor operatively connected to said pump and connectable to a power source, a fluid reservoir, and a main control valve that is capable of being actuated by a user, wherein when said motor is connected to a power source and said valve is actuated by a user, pressurized fluid can flow from said pump to said main control valve and then through a passage in said cylinder head and into said first cavity portion.

22. The hydraulic cylinder of claim 21 wherein said reservoir is in the form of an expansible tube of resilient material and inwardly contains said pump.

23. The hydraulic cylinder of claim 22 wherein said cylinder head includes a tubular portion that inwardly contains said reservoir.

24. A hydraulic cylinder comprising:
an elongated body that inwardly contains a piston that is slidable within an interior cavity of said body, wherein said cavity is defined by a tubular sidewall, wherein said piston divides said cavity into first and second cavity portions, wherein said piston is attached to a portion of an elongated piston rod, wherein sliding movement of said piston causes said piston rod to move in a direction parallel to a longitudinal axis of said body; and
a cylinder head located at one end of said body, wherein said cylinder head includes an outwardly extending tubular portion that has a diameter no greater than an amount approximately equal to an outer diameter of the sidewall that defines said cavity in said body, wherein said tubular portion is elongated and has a longitudinal axis that is substantially collinear with said longitudinal axis of said body, wherein said cylinder head inwardly contains a fluid reservoir, a pump operatively connected to a power source, and a control valve, wherein said pump and said reservoir are located within said tubular portion of said cylinder head, wherein said pump is capable of providing pressurized fluid to said control valve and has a fluid inlet that is capable of receiving fluid from said fluid reservoir, wherein said control valve is capable of being actuated through the actions of an electrical mechanism, wherein said mechanism is electrically connected to a control located exterior to said cylinder, wherein when said control valve is actuated by said electrical mechanism in a predetermined manner, pressurized fluid will flow from said control valve into said second cavity portion while fluid from said first cavity portion is directed into said fluid reservoir.

25. A hydraulic cylinder comprising:

an elongated body that inwardly contains a piston that is slidable within an interior cavity of said body, wherein said piston divides said cavity into first and second cavity portions, wherein said piston is attached to a portion of an elongated piston rod, wherein sliding movement of said piston causes said piston rod to move in a direction parallel to a longitudinal axis of said body; and a cylinder head located at one end of said body, wherein said cylinder head inwardly contains a fluid reservoir, a pump operatively connected to a power source, and a control valve, wherein said fluid reservoir is in the form of a resilient bag having a body portion and a distal end portion, wherein said body portion inwardly contains said pump and said distal end portion of said bag is in the form of an expansible bellows that enables an internal volume of the fluid reservoir to change in response to changes in the amount of fluid retained within said reservoir, wherein said pump is capable of providing pressurized fluid to said control valve and has a fluid inlet that is capable of receiving fluid from said fluid reservoir, wherein said control valve is capable of being actuated through the actions of an electrical mechanism, wherein said mechanism is electrically connected to a control located exterior to said cylinder, and wherein when said control valve is actuated by said electrical mechanism in a predetermined manner, pressurized fluid will flow from said control valve into said second cavity portion while fluid from said first cavity portion is directed into said fluid reservoir.

26. The hydraulic cylinder of claim 25 wherein said fluid reservoir is located within an interior area of a tubular, outwardly-extending portion of said cylinder head, wherein the body portion of said resilient bag has a diameter that is complementary to a diameter of said interior area, and wherein said interior area is vented to the ambient atmosphere.

27. A hydraulic cylinder comprising:

an elongated body that inwardly contains a piston that is slidable within an interior cavity of said body, wherein said piston divides said cavity into first and second cavity portions, wherein said piston is attached to a portion of an elongated piston rod, wherein sliding movement of said piston causes said piston rod to move in a direction parallel to a longitudinal axis of said body; and a cylinder head located at one end of said body, wherein said cylinder head inwardly contains a fluid reservoir, a pump operatively connected to a power source, and a control valve, wherein said fluid reservoir is in the form of an elongated resilient bag that is axially expansible to enable an internal volume of the fluid reservoir to change in response to changes in the amount of fluid retained within said reservoir, wherein said pump is capable of providing pressurized fluid to said control valve and has a fluid inlet that is capable of receiving fluid from said fluid reservoir, wherein said control valve is capable of being actuated through the actions of an electrical mechanism, wherein said mechanism is electrically connected to a control located exterior to said cylinder, and wherein when said control valve is actuated by said electrical mechanism in a predetermined manner, pressurized fluid will flow from said control valve into said second cavity portion while fluid from said first cavity portion is directed into said fluid reservoir.

28. A hydraulic cylinder comprising:

an elongated, tubular body that inwardly contains a piston that is slidable within an interior cavity of said body, wherein said piston is attached to a portion of an elongated piston rod, wherein said body has a longitudinal axis that is substantially collinear with a longitudinal axis of said piston rod;

a cylinder head that extends outwardly from said body, wherein said cylinder head inwardly contains a fluid reservoir, a pump, and a main control valve that is actuated through the action of an electrical mechanism that is also located within said cylinder head, wherein said elongated body and said cylinder head together form an elongated unit having a substantially uniform diameter;

a motor operatively connected to said pump and capable of causing said pump to provide pressurized fluid to said valve;

wherein said main control valve can direct fluid from said first cavity portion into said fluid reservoir, and wherein said pump has a fluid inlet that is capable of receiving fluid from said fluid reservoir; and wherein said electrical mechanism is electrically connected to a control located exterior to said cylinder, wherein said motor is connected to a source of electrical power located exterior to said cylinder, wherein said motor and said electrical mechanism both receive electrical power via a connection in said cylinder head, and wherein when said valve is actuated by said electrical mechanism in a predetermined manner, pressurized fluid will flow from said main control valve, through a passage in said cylinder head, and into said second cavity portion.

* * * * *